United States Patent [19]

Turner et al.

[11] Patent Number: 4,525,522
[45] Date of Patent: Jun. 25, 1985

[54] DRILLING FLUIDS BASED ON SULFONATED THERMOPLASTIC POLYMERS HAVING IMPROVED LOW TEMPERATURE RHEOLOGICAL PROPERTIES

[75] Inventors: S. Richard Turner, Bridgewater, N.J.; Thad O. Walker, Humble, Tex.; Dennis G. Peiffer, East Brunswick; Robert D. Lundberg, Bridgewater, both of N.J.

[73] Assignee: Exxon Research and Engineering Co., Florham Park, N.J.

[21] Appl. No.: 416,935

[22] Filed: Sep. 13, 1982

[51] Int. Cl.$^3$ .......................... C08L 41/00; C09K 3/00
[52] U.S. Cl. ................................ 524/547; 252/8.55 R
[58] Field of Search .................... 524/547; 252/8.55 R

[56] References Cited

U.S. PATENT DOCUMENTS

| | | | |
|---|---|---|---|
| 2,778,809 | 1/1957 | Mussell et al. | 524/547 |
| 2,894,584 | 7/1959 | Birdwell et al. | 252/8.55 R |
| 2,898,294 | 8/1959 | Priest et al. | 252/8.55 R |
| 2,913,429 | 11/1959 | Floria et al. | 524/547 |
| 3,067,161 | 12/1962 | Roth | 524/547 |
| 3,232,870 | 2/1966 | Cowan et al. | 252/8.55 R |
| 3,252,903 | 5/1966 | Crittendon | 252/8.55 R |
| 3,283,817 | 11/1966 | Roberts | 252/8.55 R |
| 3,551,393 | 12/1970 | Muzyczko et al. | 524/547 |
| 3,962,099 | 6/1976 | Whitfill | 252/8.55 R |
| 4,373,056 | 2/1983 | Besecke et al. | 524/547 |

FOREIGN PATENT DOCUMENTS

| | | | |
|---|---|---|---|
| 8000590 | 4/1980 | European Pat. Off. | 252/8.55 R |
| 2920539 | 11/1979 | Fed. Rep. of Germany | 252/8.55 R |
| 895033 | 4/1962 | United Kingdom | 524/547 |
| 2084586 | 4/1982 | United Kingdom | 252/8.55 R |

Primary Examiner—Paul R. Michl
Assistant Examiner—N. Sarofim
Attorney, Agent, or Firm—Richard E. Nanfeldt

[57] ABSTRACT

The present invention relates to latices of sulfonated thermoplastic polymers which function as viscosification agents when added to oil-based drilling muds which are the fluids used to maintain pressure, cool drill bits and lift cuttings from the holes in the drilling operation for oil and gas wells. The sulfonated thermoplastic polymer of the latex has about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated polymer, wherein the polar cosolvent increases the solubility of the sulfonated polymer in the oil drilling mud by decreasing the strong ionic interactions between the sulfonate groups of the sulfonated polymer.

14 Claims, No Drawings

DRILLING FLUIDS BASED ON SULFONATED THERMOPLASTIC POLYMERS HAVING IMPROVED LOW TEMPERATURE RHEOLOGICAL PROPERTIES

FIELD OF THE INVENTION

The present invention relates to latices of sulfonated thermoplastic polymers which function as viscosification agents when added to oil-based drilling muds which are the fluids used to maintain pressure, cool drill bits and lift cuttings from the holes in the drilling operation for oil and gas wells. The sulfonated thermoplastic polymer of the latex has about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated polymer, wherein the polar cosolvent increases the solubility of the sulfonated polymer in the oil drilling mud by decreasing the strong ionic interactions between the sulfonate groups of the sulfonated polymer.

The drilling muds formed from these latices of the sulfonated thermoplastic polymers exhibit improved low temperature rheological properties as compared to drilling muds formed from powders of sulfonated thermoplastic polymers.

BACKGROUND OF THE INVENTION

In the field of drilling in the exploration for oil and gas, an important component is that of the formulation of drilling muds. Drilling muds are the fluids which are used to maintain pressure, cool drill bits, and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or, amine-treated clays (also as viscosification agent).

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application has; heretofore, not been particularly successful in that the resulting viscosification agents must maintain adequate viscosities under the drilling conditions which can involve high temperature and high shear conditions.

There has been a substantial need for a drilling fluid which would exhibit good performance at high temperature in water sensitive formations. Past experience has shown that oil-based drilling fluids can provide good performance in water sensitive formations, and the state of the art systems can perform well up to about 350° F. Typically, in such formulations, the failure of the viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need; therefore, for drilling fluids which can maintain their viscosity and gel strength at temperatures up to and exceeding 400° F. These needs are not adequately met by the current drilling fluids, even with the oil-based drilling muds often employed.

This invention describes an approach to viscosification of oil-based drilling muds which permits the substitution of latices of sulfonated ionomers for asbestos fines and amine clays. The resulting polymer-modified drilling muds display improved low temperature rheological properties which include improved gel strength at up to temperatures of 400° F. and higher, based on tests conducted for 16 hours at such temperatures.

The types of sulfonated polymers that are envisioned in the present invention include latices of sulfonated polystyrene or sulfonated poly-t-butyl styrene and p-methyl styrene copolymers. These polymers possess suitable solubilities in the drilling mud environment.

It has also been shown that sulfonated EPDM is very effective as a viscosifier for oil-based drilling muds, as described in U.S. Ser. No. 292,235, now U.S. Pat. No. 4,447,338 entitled, "Drilling Mud Viscosification Agents Based on Sulfonated Ionomers". We have found that sulfonated EPDM provides good viscosification at temperatures of about 300° F. and below when formulated in a mud based on fresh water.

In U.S. Ser. No. 292,235, a high temperature drilling mud was formulated by the incorporation of a powdered, sulfonated polystyrene directly into the drilling mud. The instant application differs from U.S. Ser. No. 292,235 in that a latex of the sulfonated polystyrene is used to formulate the drilling mud. Quite unexpectedly, the use of the latex of the sulfonated polystyrene in forming the drilling mud rather than the powder form, results in a drilling mud having improved low temperature rheological properties.

The instant invention will describe materials that provide improved, excellent gel strength at low temperatures and may be effective at even higher temperatures.

The preferred species of the instant invention is a latex of lightly sulfonated polystyrene with a sulfonate level of about 5 to about 100 meq. of sulfonate groups per 100 grams of sulfonated polymer. It is believed that this polymer is not soluble in either the hydrocarbon phase or the aqueous phase of a formulated mud and; therefore, the polymer is probably located at the interface. As a consequence, this polymer is an extremely effective viscosifier even at quite low levels.

A second facet of the instant invention relates to the use of these materials in formulations which employ high concentrations of salt in the aqueous phase. The latex of the sulfonated polystyrenes (SPS) which are the preferred embodiment of this invention, lose some of their efficacy in salt water. It has been found that the combination of a suitable non-ionic emulsifier with the latex of the SPS gives formulations which are effective with salt water. Therefore, these systems give formulations which perform well at low temperatures and in the presence of salt water phases, which is a highly desired objective in the drilling fluids industry.

SUMMARY OF THE INVENTION

The present invention relates to latices of sulfonated thermoplastic polymers which function as viscosification agents when added to oil-based drilling muds which are the fluids used to maintain pressure, cool drill bits and lift cuttings from the holes in the drilling operation for oil and gas wells. The sulfonated thermoplastic polymer of the latex has about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated polymer, wherein the polar cosolvent increases the solubility of the sulfonated polymer in the oil drilling mud by decreasing the strong ionic interactions between the sulfonate groups of the sulfonated polymer.

The drilling muds formed from these latices of the sulfonated thermoplastic polymers exhibit improved low temperature rheological properties as compared to drilling muds formed from powders of sulfonated thermoplastic polymers.

GENERAL DESCRIPTION OF THE INVENTION

The present invention describes a new class of viscosification agents for oil-based drilling muds which are used during operation of gas and oil wells, wherein these viscosification agents are latices of sulfonated thermoplastic polymers. The oil-based drilling muds of the instant invention minimally comprise, but can also include other additives; an organic liquid such as an oil, fresh water or salt water, an emulsifier, a wetting agent, a weighting material and a latex of sulfonated polymer. In general, the oil-based drilling mud has a specific gravity of about 7 pounds per gallon to about 20 pounds per gallon, more preferably about 10 to about 16, and most preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 20 to about 50 lb/bbl. of an emulsifier and/or supplementary emulsifier; about ½ to about 5 lb/bbl. of a wetting agent; and weighting material (barium sulfate or barite) necessary to give the desired mud density; which comprises less than about 800 lb/bbl. of barium sulfate, more preferably about 5 to about 750, and most preferably about 10 to about 700; and about 0.5 to about 20 lb/bbl. of a latex of sulfonated polymer, wherein the latex contains about 20 to 50 weight percent of the sulfonated thermoplastic polymer.

The oil employed in the oil-based drilling mud is generally a No. 2 diesel fuel, but it can be other commercially available hydrocarbon solvents such as kerosene, fuel oils of selected crude. If crudes are used, they should be weathered and must be free of emulsion breakers.

Typical, but non-limiting examples of suitable emulsifiers which can be readily employed are magnesium or calcium soaps of fatty acids.

Typical, but non-limiting examples of a suitable wetting agent which can be readily employed is an alkylaryl sulfonate.

Typical, but non-limiting examples of a weighting material which can be readily employed is barite or a barium sulfate which may optionally be surface-treated with other cations, such as calcium.

The latex of the neutralized sulfonate-containing polymers are formed by a free radical copolymerization process. The monomer used in the free radical emulsion copolymerization process is styrene monomer, which is copolymerized with sulfonate-containing styrene monomer.

In general, the styrene and sulfonate-containing styrene monomer are dispersed in a water phase in the presence of an initiator and a suitable surfactant, wherein the temperature is sufficient to initiate polymerizaton. The resultant latex is added to the drilling mud formulation at about 0.5 to about 20 lb/bbl., wherein the latex contains about 20 to about 50 weight percent of the sulfonate-containing prepolymer.

The sulfonate-containing polymers formed from the free radical emulsion copolymerization process of the instant invention can be generally described as having an $\overline{M}_n$ of about 5,000 to about 200,000, more preferably about 10,000 to about 100,000. The sulfonate-containing polymers of the instant invention contain about 18 to about 100 meq. of sulfonate groups per 100 grams of polymer, more preferably about 18 to about 90, and most preferably about 20 to about 80. The sulfonate-containing polymer which is formed by the instant, free radical emulsion copolymerization process is styrene/sodium styrene sulfonate copolymer.

The sulfonate-containing monomers of the instant invention which are water soluble can be generally described as a monomer having unsaturation and a metal or amine sulfonate group. The metal or amine neutralized sulfonate monomer is characterized by the formula:

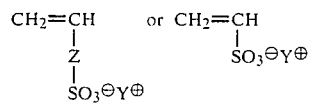

wherein Z is φ or

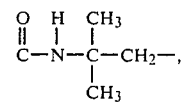

and Y⊕ is a cation selected from Groups IA, IIA, IB and IIB of the Periodic Table or an amine of the formula:

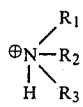

where $R_1$, $R_2$ and $R_3$ can be aliphatic groups of $C_1$ to $C_{12}$ or hydrogen. Particularly suitable metal cations are sodium, potassium and zinc, and an especially preferred metal cation is sodium. A typical, but non-limiting example of suitable sulfonate-containing monomer is:

sodium styrene sulfonate

An especially preferred sulfonate-containing monomer is metal styrene sulfonate. The molar ratio of sulfonate-containing monomer to styrene monomer is about 1/200 to about 1/5, more preferably about 1/150 to about 1/6 and most preferably about 1/100 to about 1/9.

The redox emulsion polymerization recipe used in this invention is effective in initiating the copolymerization of water insoluble and water soluble comonomers in an emulsion system.

A variety of free radical catalysts can be employed in this invention including the water soluble varieties, potassium persulfate, ammonium persulfate, etc., and the oil/water soluble redox systems such as benzoyl peroxide/$(NH_4)_2FeSO_4$, etc.

The surfactants employed for this invention are varied and well-known in the art. The typical emulsifiers or surfactants can be employed; however, some are more effective than others in generating latices of better stability. A preferred emulsifier is sodium lauryl sulfate.

The buffering agents, if used, in the instant polymerization process are selected from the group consisting of sodium carbonate, ammonia, sodium acetate, trisodium phosphate etc. These buffering agents are employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is from 0 to about 1.0 grams per 100 grams of the combined weight of the sulfonate-containing monomer and the conjugated diene.

The free radical emulsion copolymerization of the water soluble sulfonate-containing polymer and the styrene monomer yields a stable latex, wherein the resultant water insoluble sulfonate-containing copolymer is not covalently cross-linked and possesses substantial ionic cross-linking, and has about 18 to about 100 meq. of sulfonate groups per 100 grams of polymer, more preferably about 18 to about 90.

DETAILED DESCRIPTION OF THE PREFERRED EMBODIMENTS

EXAMPLE I

The copolymer emulsions which were used in the drilling mud formulations are prepared by emulsion techniques that allow incorporation of sodium sulfonate styrene monomer into styrene to form the sulfonate-containing copolymer. A glass pressure bottle was charged with 50 ml. of deaerated water, 25.0 g. of styrene, 1.0 g. of NaSS, 1.6 g. of sodium lauryl sulfate, 0.1 g. of potassium persulfate and 0.1 g. of dodecyl thiol as a chain transfer agent to control molecular weight. The bottle was flushed with nitrogen, capped and then was shaken at 50° C. in a thermostatted water bath for six hours. The resulting stable emulsion was short stopped with hydroquinone and cooled to room temperature. This emulsion was either used directly in the drilling fluid formulation or the polymer was coagulated and isolated utilizing methanol and sodium chloride. The white solid copolymer isolated after water washing (to remove emulsifier) was dried to a white powder with a sulfur content of 0.65% which is equivalent to 2.05 mol % NaSS in the copolymer. This dry powder was also utilized in the drilling mud formulation in order to compare drilling mud formulations made from both the powdered form of the sulfonate-containing styrene polymer and those made from the corresponding latex of the sulfonate-containing styrene polymer.

EXAMPLE 2

Oil-based drilling muds were prepared using standard laboratory techniques. A typical mud was prepared by mixing 205.82 g. of No. 2 diesel oil, 34.76 g. Oil Faze (Magcobar), 1.5 g. SE11 and 1.5 g. DV33 (Magcobar). To this mixture was added 10 g. of $CaCl_2$ in 21 ml. of water. The mud was weighted with 226.35 g. of Barite and then 4.4 g. of additional $CaCl_2$ were added. The sodium salt of the sulfonated styrene (1.99 mol % sulfonate units) was added at 2 lb/bbl. as either the emulsion or as the precipitate solid. The mud was aged overnight at 150° F. to insure chemical equilibrium. Aliquots were aged at 300° F. and 400° F. for 16 hours in pressurized cells. The cells were cooled to room temperature and then the rheological properties of the mud were measured on a Fann Model 35 viscometer at 115° F. The results for tests comparing emulsion versus precipitated powder are shown in Table I.

TABLE I

| Comparison of SPS in Latex Form and in Precipitated Solid Form in Oil-Based Drilling Muds | | | | | | |
|---|---|---|---|---|---|---|
| | 150° C. | 300° C. | 400° C. | 150° C. | 300° C. | 400° C. |
| | Solid (1.99 mol % NaSS) | | | Latex (1.99 mol % NaSS) | | |
| 600 rpm viscosity | 34 | 37 | 43 | 45 | 58 | 56 |
| Yield point | 0 | 0 | 3 | 7 | 8 | 6 |
| 0 gel strength | 3 | 2 | 2 | 4 | 5 | 4 |
| 10 min. gel strength | 3 | 3 | 9 | 7 | 14 | 14 |
| | Solid (1.64 mol % NaSS) | | | Latex (1.64 mol % NaSS) | | |
| 600 rpm viscosity | 37 | 39 | 58 | 44 | 51 | 73 |
| Yield point | 3 | 0 | 0 | 6 | 0 | 11 |
| 0 gel strength | 3 | 1 | 2 | 2 | 3 | 3 |
| 10 min. gel strength | 4 | 2 | 3 | 5 | 4 | 6 |

What is claimed is:

1. An oil-based drilling mud which consisting essentially of:
   (a) an organic liquid substantial immiscible in water;
   (b) about 1 to about 10 parts by weight of water per 100 parts by weight of the organic liquid;
   (c) about 20 to about 50 lb/bbl. of an emulsifier and/or emulsifier package;

(d) weighting material necessary to achieve the desired density; and (e) about 0.5 to about 20.0 lb/bbl. which is equivalent to 0.15 to 6 lb/bbl said polymer derived from the latex of a water insoluble and oil insoluble neutralized sulfonate-containing styrene polymer, said neutralized sulfonated thermoplastic polymer having about 5 to about 100 meq. of sulfonate groups per 100 grams of the neutralized sulfonate-containing styrene polymer, said latex containing about 20.0 to about 50.0 weight percent of the neutralized sulfonate-containing styrene polymer, said sulfonated polymer being located at oil/water interface of said drilling mud, said sulfonated polymer having about 5 to about 100 meq. of sulfonate groups per 100 grams of said sulfonated polymer, said sulfonated polymer being formed the polymerization of a water soluble monomer and a monomer characterized by the formula:

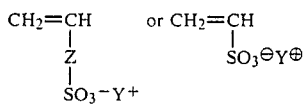

wherein Z is $\phi$ or

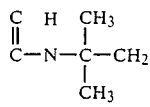

and $Y^{\oplus}$ is a cation selected from the group consisting of Groups IA, IIA, IB and IIB of the Periodic Table and an amine.

2. A drilling mud according to claim 1, wherein the sulfonate groups of said neutralized sulfonate-containing styrene polymer are neutralized with a counterion selected from the group consisting of antimony, iron, aluminum, lead and Groups IA, IIA, IB and IIB of the Periodic Table of Elements.

3. A drilling mud according to claim 1 wherein the sulfonate groups of said neutralized sulfonate-containing styrene polymer are neutralized with sodium counterions.

4. A drilling mud according to claim 1 wherein said neutralized sulfonate-containing styrene polymer is of sodium sulfonate styrene monomer and styrene monomer.

5. A drilling mud according to claim 1 wherein said wetting agent is an alkylaryl sulfonate.

6. A drilling mud according to claim 1 wherein said weighting material is barite or barium sulfate.

7. A drilling mud according to claim 1 wherein the concentration level of said weighting material is sufficient to give said drilling mud a specific gravity of about 7 pounds per gallon to bout 20 pounds per gallon.

8. A drilling mud according to claim 1 wherein said organic liquid is an oil.

9. A drilling mud according to claim 1 wherein said organic liquid is a hydrocarbon solvent.

10. A drilling mud according to claim 1 wherein said emulsifier is a magnesium or calcium soap of a fatty acid.

11. A drilling mud according to claim 1 which further includes a polar cosolvent.

12. A drilling mud according to claim 1 wherein said water is salt water.

13. A drilling mud according to claim 1 wherein the concentration of said water is about 3 to about 5 parts by weight per 100 parts by weight of said organic liquid.

14. A drilling mud according to claim 1 wherein said organic liquid is a diesel oil.

* * * * *